US011672297B2

(12) United States Patent
Rietdyk (10) Patent No.: US 11,672,297 B2
(45) Date of Patent: Jun. 13, 2023

(54) ACCESSORY MOUNTING SYSTEM FOR A HELMET

(71) Applicant: LIFT Airborne Technologies LLC, Rancho Dominguez, CA (US)

(72) Inventor: Guido Rietdyk, Rolling Hills, CA (US)

(73) Assignee: LIFT Airborne Technologies LLC, Rancho Dominguez, CA (US)

( * ) Notice: Subject to any disclaimer, the term of this patent is extended or adjusted under 35 U.S.C. 154(b) by 243 days.

(21) Appl. No.: 17/184,515

(22) Filed: Feb. 24, 2021

(65) Prior Publication Data

US 2022/0264985 A1 Aug. 25, 2022

(51) Int. Cl.
*A42B 3/18* (2006.01)
*F16M 13/04* (2006.01)

(52) U.S. Cl.
CPC .............. *A42B 3/185* (2013.01); *F16M 13/04* (2013.01)

(58) Field of Classification Search
CPC .......... A42B 3/185; A42B 3/04; F16M 13/04; F16B 5/06; F16B 5/0607; F16B 5/0614; F16B 5/0621; F16B 5/0628; F16B 5/0635; F16B 5/0642; F16B 5/065; F16B 5/0657; F16B 5/0664; F16B 2005/0671; F16B 2005/0678; F16B 5/0685; F16B 5/0692; G02B 23/125
See application file for complete search history.

(56) References Cited

U.S. PATENT DOCUMENTS

| 4,156,292 A | 5/1979 | Helm et al. |
| 5,208,514 A | 5/1993 | Bassick |
| 5,822,126 A | 10/1998 | Cursolle et al. |
| 6,811,348 B1* | 11/2004 | Meyer ...................... A42B 3/04 403/324 |
| 9,072,328 B2 | 7/2015 | Rogers et al. |
| 9,414,633 B2 | 8/2016 | Giroux Bernier et al. |
| 9,565,885 B2 | 2/2017 | Hedges et al. |
| 9,726,889 B2 | 8/2017 | Gallery et al. |
| 10,477,948 B2 | 11/2019 | Slover |
| 10,542,787 B2* | 1/2020 | Lebel ..................... A42B 3/326 |
| 11,363,850 B2* | 6/2022 | Vilone ................ F16M 11/041 |
| 2003/0058100 A1 | 3/2003 | Jumpertz |

(Continued)

FOREIGN PATENT DOCUMENTS

| CN | 111280578 A | 6/2020 |
| CN | 210809463 U | 6/2020 |

(Continued)

*Primary Examiner* — Terrell L McKinnon
*Assistant Examiner* — Ding Y Tan
(74) *Attorney, Agent, or Firm* — Lowe Graham Jones PLLC (57) ABSTRACT

A helmet mount includes a latching plate defining a latching opening with wide and narrow portions and a notch. A latching spring below the latching plate urges a spring portion against the wide portion. The shaft of a first pin on an accessory mount is sized to fit in the narrow portion while its widened head only fits through the wide portion. The spring portion engages the widened head and prevents sliding within the narrow portion. The shaft of a second pin slides within the notch with its widened head preventing removal. A wedge may be slid against the spring to retract the spring portion allowing removal of the first pin. Electrical contacts on the helmet mount may engage electrical contents on the accessory mount to supply power to an accessory such as night-vision goggles.

17 Claims, 9 Drawing Sheets

(56) References Cited

U.S. PATENT DOCUMENTS

| | | | |
|---|---|---|---|
| 2008/0263752 A1* | 10/2008 | Solinsky | A42B 3/042 2/422 |
| 2011/0145981 A1* | 6/2011 | Teetzel | G02B 23/125 2/422 |
| 2012/0099849 A1* | 4/2012 | Onishi | B60R 11/04 396/419 |
| 2012/0099850 A1* | 4/2012 | Onishi | B60R 11/04 396/419 |
| 2014/0020159 A1* | 1/2014 | Teetzel | A42B 3/04 2/422 |
| 2014/0245523 A1* | 9/2014 | Teetzel | G02B 23/125 2/422 |
| 2014/0373423 A1 | 12/2014 | Teetzel et al. | |
| 2015/0232131 A1* | 8/2015 | Morris | F16B 5/065 403/14 |
| 2015/0282548 A1* | 10/2015 | Tulley | A42B 3/04 396/428 |
| 2015/0282549 A1* | 10/2015 | Lebel | A42B 3/042 2/422 |
| 2016/0085077 A1 | 3/2016 | Milea et al. | |
| 2016/0191172 A1* | 6/2016 | Masarik | F16M 13/04 361/679.01 |
| 2018/0208312 A1 | 7/2018 | Zapata | |
| 2019/0008227 A1* | 1/2019 | Vilone | A45F 5/02 |
| 2020/0288806 A1* | 9/2020 | Vilone | G03B 17/561 |
| 2020/0337448 A1* | 10/2020 | Grinnell | G03B 17/561 |

FOREIGN PATENT DOCUMENTS

| | | | | |
|---|---|---|---|---|
| EP | 2299857 B1 | | 3/2012 | |
| EP | 3154384 B1 | | 1/2019 | |
| GB | 2539107 A | * | 12/2016 | A42B 1/24 |
| WO | 2019106046 A1 | | 6/2019 | |
| WO | WO-2019119070 A1 | * | 6/2019 | A42B 3/042 |
| WO | WO-2019234373 A1 | * | 12/2019 | A42B 3/042 |
| WO | WO-2020237189 A1 | * | 11/2020 | A42B 3/04 |

* cited by examiner

ACCESSORY MOUNTING SYSTEM FOR A HELMET

FIELD OF THE INVENTION

This application relates to systems for mounting items to a helmet, and, more particularly to systems for mounting night-vision googles to a helmet.

BACKGROUND OF THE INVENTION

In many military situations, an individual may use night-vision goggles to provide visibility in low light conditions. It is advantageous to wear these goggles rather than holding them in a hand. A common way to wear night-vision goggles is to mount them to the helmet of a user.

It would be an advancement in the art to provide an improved implementation of helmet-mounted accessories, such as night-vision goggles.

SUMMARY OF THE INVENTION

In one aspect of the invention, a helmet mount includes a latching plate configured to secure to a helmet and defining first latching structures. One or more first electrical contacts are coupled to the latching plate. An accessory mount is configured to secure to an accessory for use by a wearer of the helmet. The accessory mount includes second latching structures configured to removably engage the first latching structures. One or more second electrical contacts are mounted to the accessory mount and positioned to be in electrical contact with the one or more first electrical contacts when the first latching structures are engaged with the second electrical contacts.

Night-vision goggles may be coupled to the accessory mount, the night-vision goggles being electrically coupled to the one or more second electrical contacts. A power source may be electrically coupled to the one or more first electrical contacts.

The latching plate may include a planar portion configured to face a front of the helmet when secured thereto. In some embodiments, no portion of the helmet mount extends above the planar portion.

In some embodiments, the latching plate defines a longitudinal direction, a vertical direction perpendicular to the longitudinal direction, and a transverse direction perpendicular to the longitudinal direction and the vertical direction. The first latching structures include the latching plate defining a latching opening extending along the longitudinal direction between a first end of the latching opening and a second end of the latching opening opposite the first end. The latching opening may include a wide portion extending from the first end along the longitudinal direction and a narrow portion extending from the wide portion to the second end along the longitudinal direction, the narrow portion being narrower than the wide portion in the transverse direction. The second latching structures may include a first pin having a first shaft and a first widened head portion at a distal end of the first shaft that is wider than the first shaft. The first widened head portion may be sized to be insertable through the wide portion but not the narrow portion and the first shaft may be sized to be slidable within the narrow portion. A latching spring may be mounted below the latching plate and defines a spring portion biased against the latching plate and overlapping the latching opening. The spring portion may include a latching edge that is offset from the second end of the latching opening such that the first shaft is positionable in the narrow portion of the latching opening with the latching edge engaging the first widened head portion. The spring portion may be at a distal end of the latching spring. The spring portion may be a planar portion.

The accessory mount may further include a second pin including a second shaft and a second widened head portion at a distal end of the second shaft that is wider than the second shaft. The latching plate may further include a notch extending inwardly from an edge of the latching plate such that the first end of the latching opening is positioned between the notch and the second end of the latching opening, the notch being positioned such that the second shaft is positionable in the notch when the first shaft is positioned within the narrow portion. The narrow portion and the notch may both include straight portions parallel to the longitudinal direction.

The helmet mount may further include a base plate having a curved lower surface shaped to conform to a helmet, the latching plate being mounted to an upper surface of the base plate. The base plate may define an opening, the latching spring being positioned within the opening.

The latching spring may include a sloped surface. The helmet mount may further include a wedge slidably coupled to the latching plate and slidable along the longitudinal direction into engagement with the sloped surface in order to urge the latching spring away from the latching plate. A biasing member may engage the wedge and urge the wedge away from the sloped surface.

The helmet mount may include a latching plate configured to secure to a helmet and defining first latching structures. The latching plate may include a front edge configure to face a front of the helmet when secured thereto. The accessory mount may include second latching structures configured to removably engage the first latching structures in response to sliding of the accessory mount rearwardly over the front edge onto the latching plate. The latching plate may include a planar portion defining the front edge, the first latching structures being positioned completely below an upper surface of the planar portion and completely rearward of the front edge.

In some embodiments, a base plate has a lower surface that is contoured to conform to an outer surface of a helmet, the latching plate being secured to an upper surface of the base plate. In some embodiments, the latching plate defines a longitudinal direction, a vertical direction perpendicular to the longitudinal direction, and a transverse direction perpendicular to the longitudinal direction and the vertical direction. Two latching openings may be defined in the latching plate offset from one another along the transverse direction. Each latching opening may have a first end and a second end offset from the first end along the longitudinal direction. Each latching opening may have a wide portion extending from the first end along the longitudinal direction and a narrow portion extending from the wide portion to the second end along the longitudinal direction. The narrow portion may be narrower than the wide portion in the transverse direction. Two notches may be defined by the latching plate extending inwardly from an edge of the latching plate such that the first ends of the two latching openings are positioned between the two notches and the second ends of the two latching openings.

In some embodiments, the accessory mount includes two first pins and two second pins. Each pin of the two first pins and two second pins may have a shaft and a widened head portion at a distal end of the shaft that is wider than the shaft. The two first pins may be positionable with shafts of the two first pins inserted in the narrow portions of the two latching openings when the shafts of the two second pins are inserted within the two notches.

In some embodiments, one or more latching springs are mounted below the latching plate and configured to urge two latching portions against an underside of the latching plate overlapping at least part of the wide portions of the two latching openings. The two latching portions may define latching surfaces configured to engage the widened head portions of the two first pins when the shafts of the two first pins are inserted within the narrow portions of the two latching openings.

In some embodiments, the one or more latching springs include a single latching spring. The single latching spring may include an attachment point secured to the base plate; a web extending from the attachment point; and two wings extending from opposite sides of the web. Two plates may each be secured to a distal end of one of the two wings, the two plates being positioned under the wide portions of the two latching openings and defining the latching surfaces.

In some embodiments, the attachment point secures to the base plate below the upper surface of the base plate and the web slopes upwardly from the attachment point toward the latching plate.

In some embodiments, a sloped portion is secured to the web and slopes downwardly from the web. The helmet mount may further include a plug slidably mounted within the base plate and slidable along the longitudinal direction. A wedge may be mounted to the plug and positioned to engage the sloped portion and urge the sloped portion away from the latching plate when the plug is urged toward the sloped portion. One or more biasing members may engage the plug and base plate and be configured to urge the plug away from the sloped portion.

In some embodiments, the base plate is made of plastic and the latching plate is made of metal.

In some embodiments, one or more first electrical contacts are mounted to the base plate. The accessory mount may include one or more second electrical contacts that are in electrical contact with the one or more first electrical contacts when the shafts of the two first pins are positioned in the narrow portions of the two latching openings and the shafts of the two second pins are positioned in the two notches.

In some embodiments, night-vision goggles are mounted to the accessory mount. A power source may be electrically coupled to the one or more first electrical contacts.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
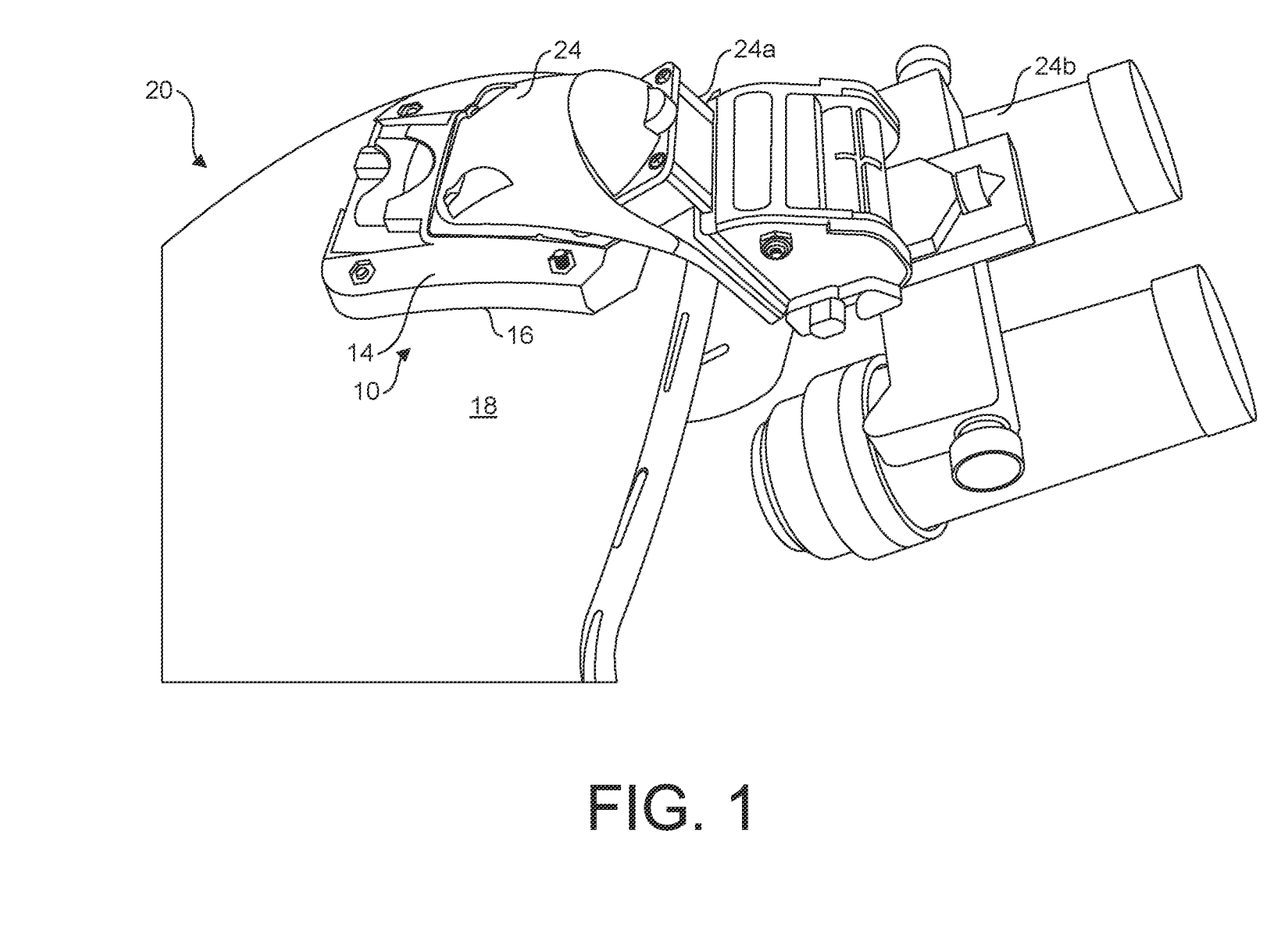
FIG. 1 is a perspective view of a helmet having night-vision goggles secured thereto using a helmet mount in accordance with an embodiment of the present invention.
Figure 2:
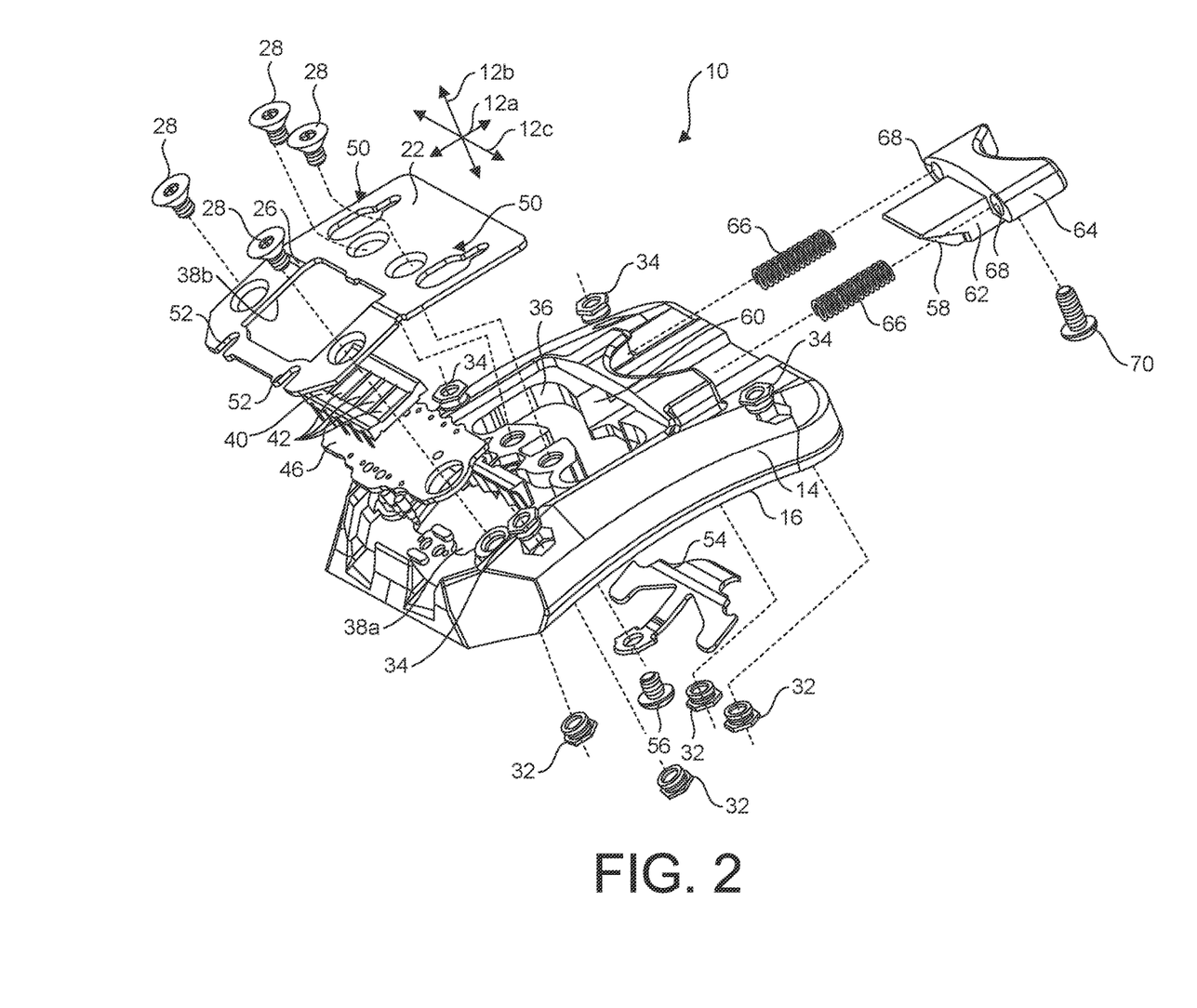
FIG. 2 is an exploded view of a helmet mount in accordance with an embodiment of the present invention.

FIGS. 1 through 4 illustrate a helmet mount 10. As shown in FIG. 2, the helmet mount 10 may be understood with respect to a longitudinal direction 12a, vertical direction 12b, and a transverse direction 12c that are all perpendicular to one another. Such directions are used herein to define relative dimensions and orientations without any requirement that these directions 12a, 12b, 12c correspond to actual longitudinal, vertical, and transverse directions during use. As used herein, "forward" shall be understood as being in one direction parallel to the longitudinal direction 12a and "rearward" shall be understood as being in the opposite direction from the forward direction parallel to the longitudinal direction 12a. As used herein, "upward" shall be understood as being in one direction parallel to the vertical direction 12b and "downward" shall be understood as being in the opposite direction from the forward direction parallel to the vertical direction 12b.

The helmet mount 10 may include a base plate 14. The base plate 14 may define a lower surface 16 that is shaped, e.g., curved, to conform to an outer surface 18 of a helmet 20 to which the helmet mount 10 is fastened. In the illustrated example, the helmet 20 is for an aircraft pilot, but combat helmets or other type of helmets may also be used.

Figure 3A:
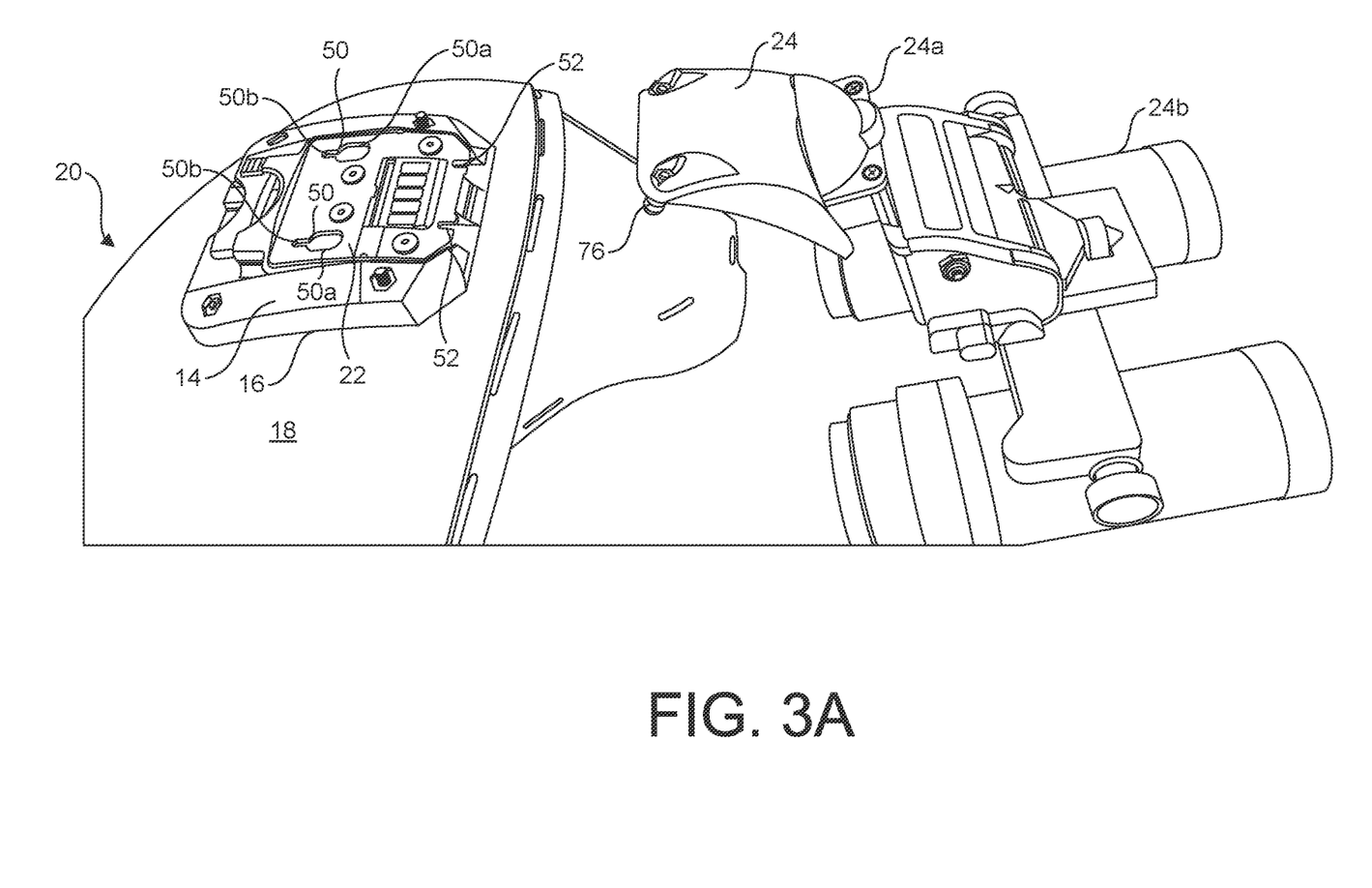
FIG. 3A is a perspective view of the helmet having the helmet mount disengaged in accordance with an embodiment of the present invention.

A latching plate 22 may secure to the base plate 14 and define structures for engaging a detachable accessory mount 24 (FIGS. 1 and 3A). The accessory mount 24 may include one or more adjustment structures 24a coupling an accessory 24b, such as night-vision goggles 24b, to the accessory mount 24 (FIG. 2). The adjustment structures 24a may provide for vertical movement and/or pivoting of the accessory 24b relative to the accessory mount 24. The adjustment structures 24a and accessory 24b may be implemented according to any approach known in the art.

The base plate 14 may be made of rigid plastic (nylon, polyvinyl chloride (PVC), acrylonitrile butadiene styrene (ABS), or other polymer) or composite (carbon fiber composite, fiberglass composite, Kevlar composite). In contrast, the latching plate 22 may be made of metal, e.g. steel, in order to provide increased strength and wear resistant for engaging directly with the accessory mount 24. As is apparent in FIG. 1, the latching plate 22 may be flat sheet of material and may include one or more bends 26 such that the latching plate 22 includes portions that are angled relative to one another (e.g., an angle between 5 and 20 degrees). This may enable the base plate 14 and latching plate 22 to conform somewhat to the curvature of the helmet 20 and reduce a profile of the helmet mount 10. In the foregoing description, a rearward portion of the latching plate 22 may be understood as being parallel to the longitudinal direction 12a and transverse direction 12c ("the longitudinal-transverse plane").

The latching plate 22 may secure to the base plate 14 by means of fasteners 28, such as screws. The base plate 14 may secure to the helmet 18 by means of fasteners 30 (see FIG. 4) passing through threaded inserts 32 within the helmet 20, through the helmet 20, through the base plate 14, and engaging threaded inserts 34 engaging the base plate 14, such as within hexagonal openings sized to receive hexagonal exteriors of the inserts 34. Other fastening approaches may also be used. The inserts 32, 34 and fasteners 28 may be made of metal, such as steel.

As shown in FIG. 2, the base plate 14 may define a latch opening 36 and a connector opening 38a. Alternatively, a single opening may provide the function of both openings 36, 38a. A connector plate 40 may secure over the connector opening 38a and may have one or more electrical contacts 42 mounted thereon. The latching plate 22 may define a connector opening 38b that at least partially overlaps the opening 38a such that contacts 42 are accessible through the connector opening 38b. The contacts 42 may contact corresponding pins 44 (see FIG. 4) on the accessory mount 24 in order to provide power and/or communication lines to a component secured to the accessory mount 24. Wires 46 coupled to the contacts 42 may extend through the connector opening 38a and may extend through a corresponding opening 48 in the helmet 20 (see FIG. 4). The wires 46 may extend out of the helmet 20 and connect to an external power source, such as a battery worn on the torso of a person wearing the helmet 20 or secured to the helmet 20, such as to the back of the helmet 20. Such an arrangement provides a lighter accessory and better balance as less weight is positioned on the front of the helmet and may be balanced elsewhere such as on the rear of the helmet or off the helmet entirely. As is apparent in FIG. 1, the connector plate 40 may be secured to the base plate 14 by means of the two or more of the fasteners 28 securing the latching plate 22 to the base plate 14.

The latching plate 22 may define one or more structures for engaging the accessory mount 24. In the illustrated embodiment, this may include a rearward pair of openings 50 and a pair of forward notches 52 offset from one another along the longitudinal direction 12a (FIGS. 2 and 3). The openings of each pair 50, 52 may be offset from one another along the transverse direction 12c. The openings 50 may include a widened portion 50a and a narrow portion 50b extending rearwardly form the widened portion 50b. The widened portion 50a may have the shape of an oval, i.e. a discorectangle defined as two circles offset from one another along the longitudinal direction 12a and connected by two parallel tangent lines. The narrow portion 50b may be smaller in the transverse direction 12c, e.g., less than 60 percent or less than 50 percent, of the width of the widened portion 50a in the transverse direction 12c. The notches 52 may have a same width as the narrow portions 50b or different widths. In the illustrated embodiment, the narrow portions 50b and notches 52 include straight sides that are parallel to the longitudinal direction 12a, the straight sides connecting to rounded, or otherwise shaped, end portion. The length of the straight sides may define a range of motion of pins within the narrow portions 50b and notches 52 during attachment and detachment of the accessory mount 24 as described below.

The rearward openings 50 may be positioned over the latching opening 36, e.g., completely over the latching opening 36 such that pins inserted through the rearward openings may engage a latching spring 54 mounted within the latching opening. The latching spring 54 may secure to an underside of the base plate 14 forward or rearward of the latching opening 36, such as by means of one or more fasteners 56 (FIG. 2).

The latching spring 54 may be disengaged by means of a detachment wedge 58 that passes through the base plate 14 and into the latching opening 36. For example, base plate 14 may define opening 60 and the wedge 58 may be mounted to a plug 62 sized to slide within the opening 60. A gripping portion 68 may be secured to a portion of the plug 62 positioned outboard from the base plate 14 and define a structure, e.g. a rounded depression, for pressing by a wearer in order to urge the wedge 58 into the latching opening 36 in order to disengage the latching spring 54. Accordingly, the gripping portion 68 may extend outwardly from the plug 62 in one or both of the vertical direction 12a and transverse direction 12c in order to provide an area for pressing by a wearer that is larger than the cross sectional area of the plug 62 in the same plane. One or more springs 64 may be positioned between the gripping portion 68 and the base plate 14 and urge the plug 62 out of the latching opening 36 until the biasing force of the springs 64 is overcome by someone pressing on the gripping portion 68. The springs 64 may insert within openings 68 in the gripping portion 68 and corresponding openings (not shown) in the base plate 14. A fastener 70 may extend through a slot 72 (see FIG. 4) in the base plate 14 to retain the plug 62 while still allowing the plug 62 to slide along the longitudinal direction 12a.

Figure 3B:
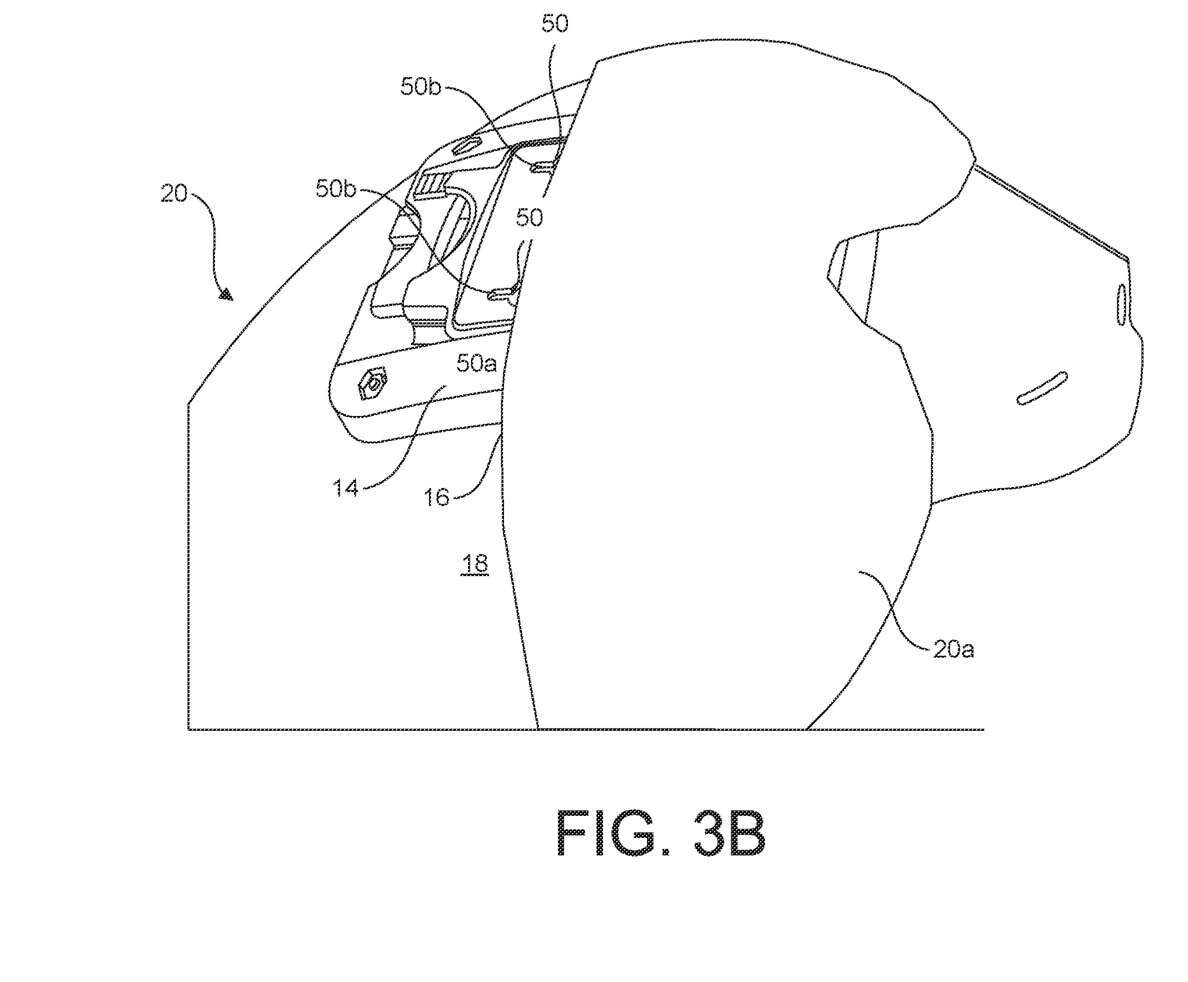
FIG. 3B is a perspective view of the helmet having the helmet mount disengaged and a helmet visor pivoted over the helmet mount in accordance with an embodiment of the present invention.

As shown in FIG. 3A, the base plate 14 and latching plate 22 extend outward the outer surface of the helmet 20 such that no portion of the helmet mount 10 extends more than 1 cm, preferably no more than 5 mm, from the helmet 20 measured along any line normal to a point on the helmet 20. As shown in FIG. 3B, such an arrangement enables a visor 20a pivotally mounted to the helmet 20 to pivot over the helmet mount 10 when the accessory mount 24 is not secured thereto. All other latching structures may be formed in the latching plate 22 or under the latching plate 22 such as no portion of the helmet mount 10 extends above the planar upper surface of the latching plate 22 when the helmet mount 10 is secured to the helmet 20. In a like manner, clearance for the visor 20a is facilitated by the fact that all latching structures (e.g., notches 52 and latching openings 50) are positioned rearward of a forward edge of the latching plate 22.

Figure 4:
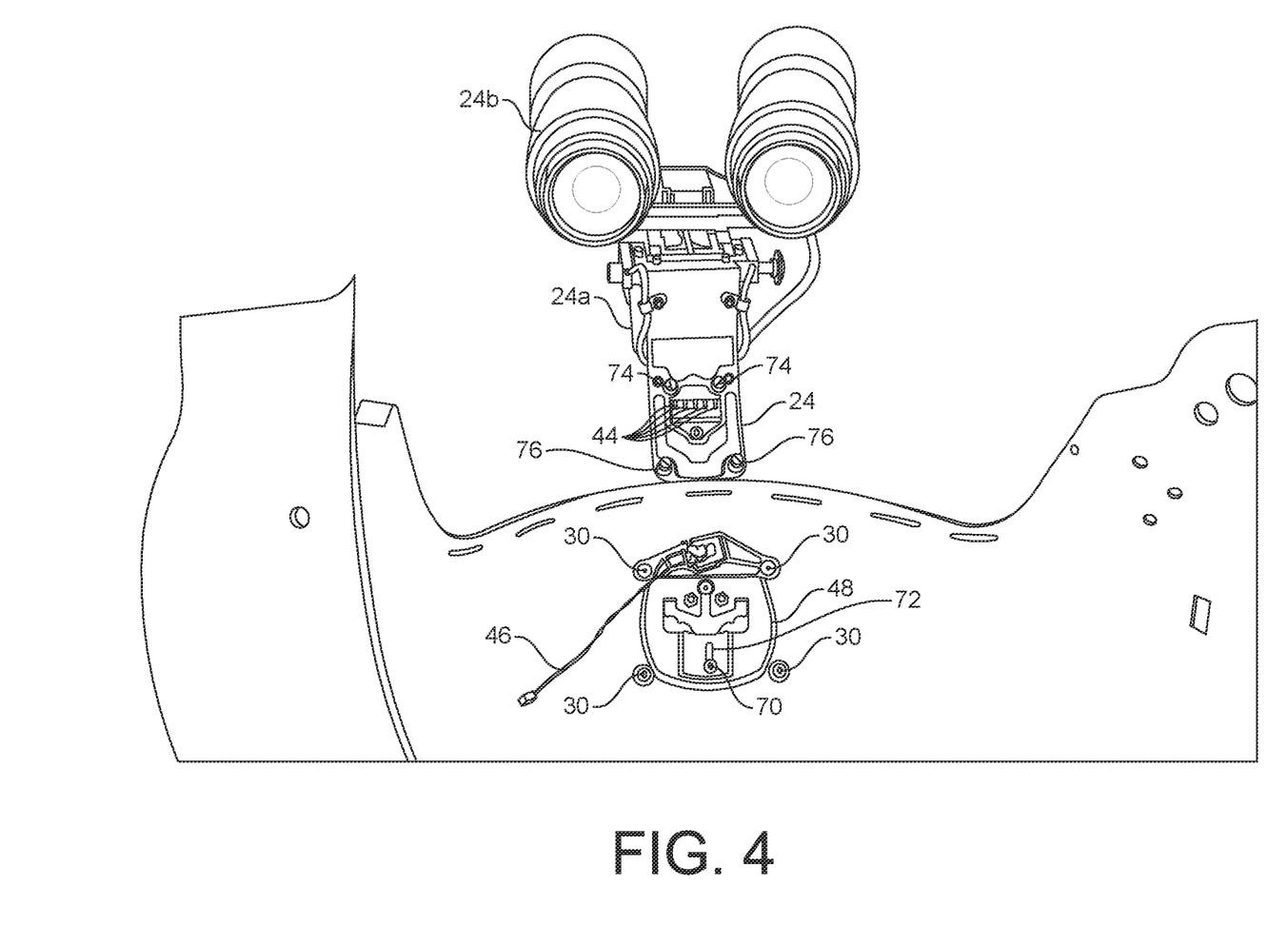
FIG. 4 is a lower perspective view of the helmet with the helmet mount disengaged in accordance with an embodiment of the present invention.

Referring specifically to FIG. 4, the accessory mount 24 may have four pins, such as two forward pins 74 and two rearward pins 76 The forward pins 74 may be sized and positioned to engage the notches 52 and may include a narrow portion and a widened head portion such that the narrow portion may be inserted in the notch 52 and the widened head portion prevents the pins 74 from being pulled out of the notch 52 perpendicular to the upper surface of the latching plate 22 around the notch 52. The rearward pins 76 may insert through the rearward openings 50 and engaging the latching spring 54.

FIGS. 5A to 5C and FIGS. 6A to 6D illustrate an example configuration of the latching spring 54 and engagement of the latching spring 54 with the rearward pins 76.

Figure 5A:
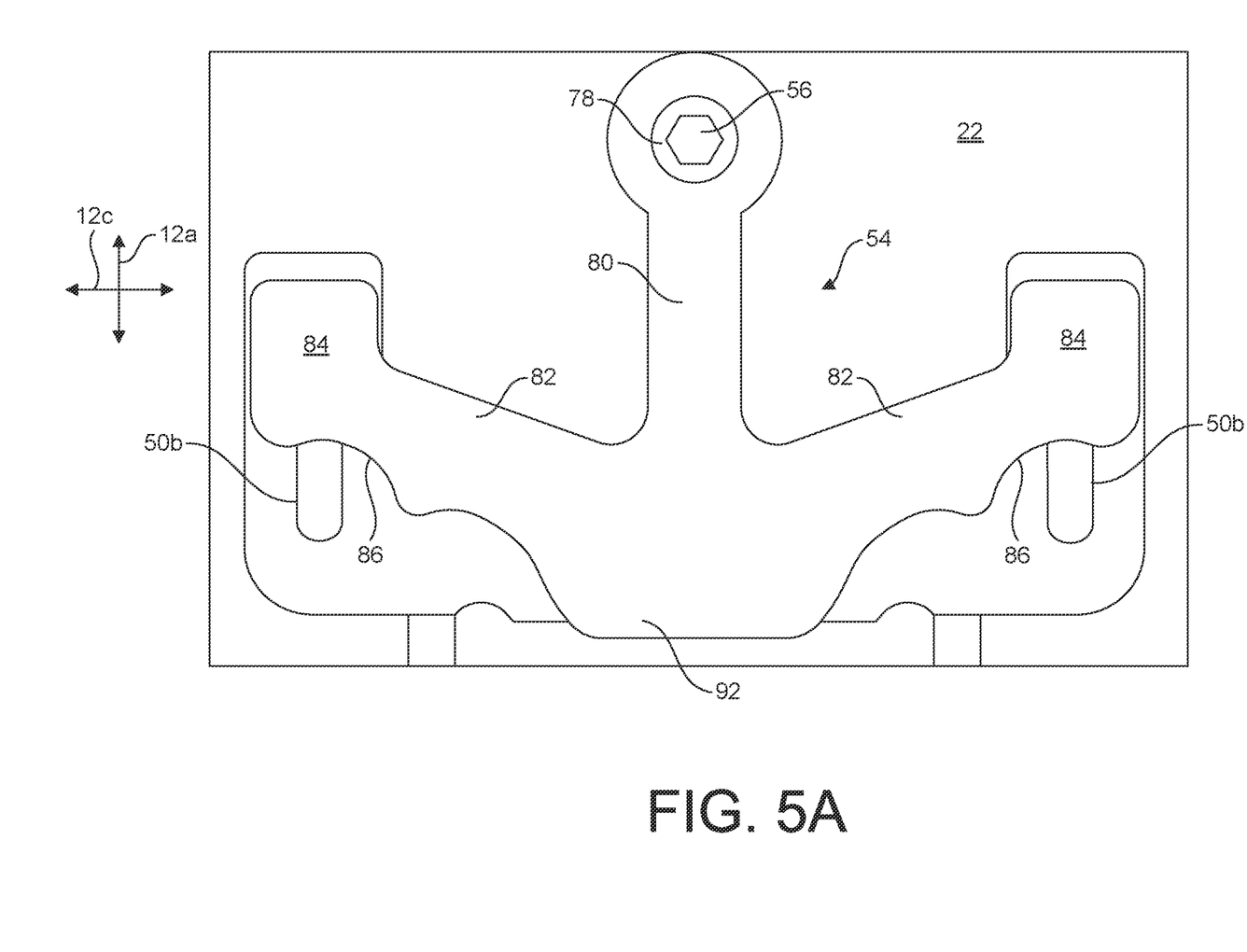
FIGS. 5A through 5C are lower views of a latch spring illustrating engagement of the helmet mount.

Referring specifically to FIG. 5A, the latching spring 54 may include an attachment point 78, e.g., an end portion defining an opening for receiving fastener 56, that secures the latching spring 54 to the base plate 14 to one side of the latching opening 36. A central web 80 extends rearwardly from the attachment point 78. Two wings 82 may extend outwardly on either side of the web 80 and each include a distal plate 84 and a rearward latching surface 86 on a rear edge of the plate 84. In the illustrated embodiment, the two wings 82 are also angled forwardly toward the attachment point 78. In the illustrated implementation, the rearward latching surface 86 is curved and may have a radius curvature slightly (e.g., less than 1 mm) larger than a radius of curvature of the widened head portion of the rearward pins 76. The central web 80 may be sloped such that the distal plates 84 are closer to the latching plate 22 than the attachment point 78. The distal plates 84 may be substantially parallel (e.g., within 5 degrees of parallel) to a lower surface of the latching plate 22 around the rearward openings 50.

As is apparent in FIG. 5A, the distal plates 84 may overlap at least a portion of the widened portion 50a of the rearward openings 50 with at least a portion of the narrow portion 50b extending rearwardly from the latching surface 86. The distal plates 84 may be sized and positioned to engage the lower surface of the latching plate 22 such that the biasing force of the web 80 does not urge the plates 84 outwardly through the rearward openings 50.

Figure 5B:
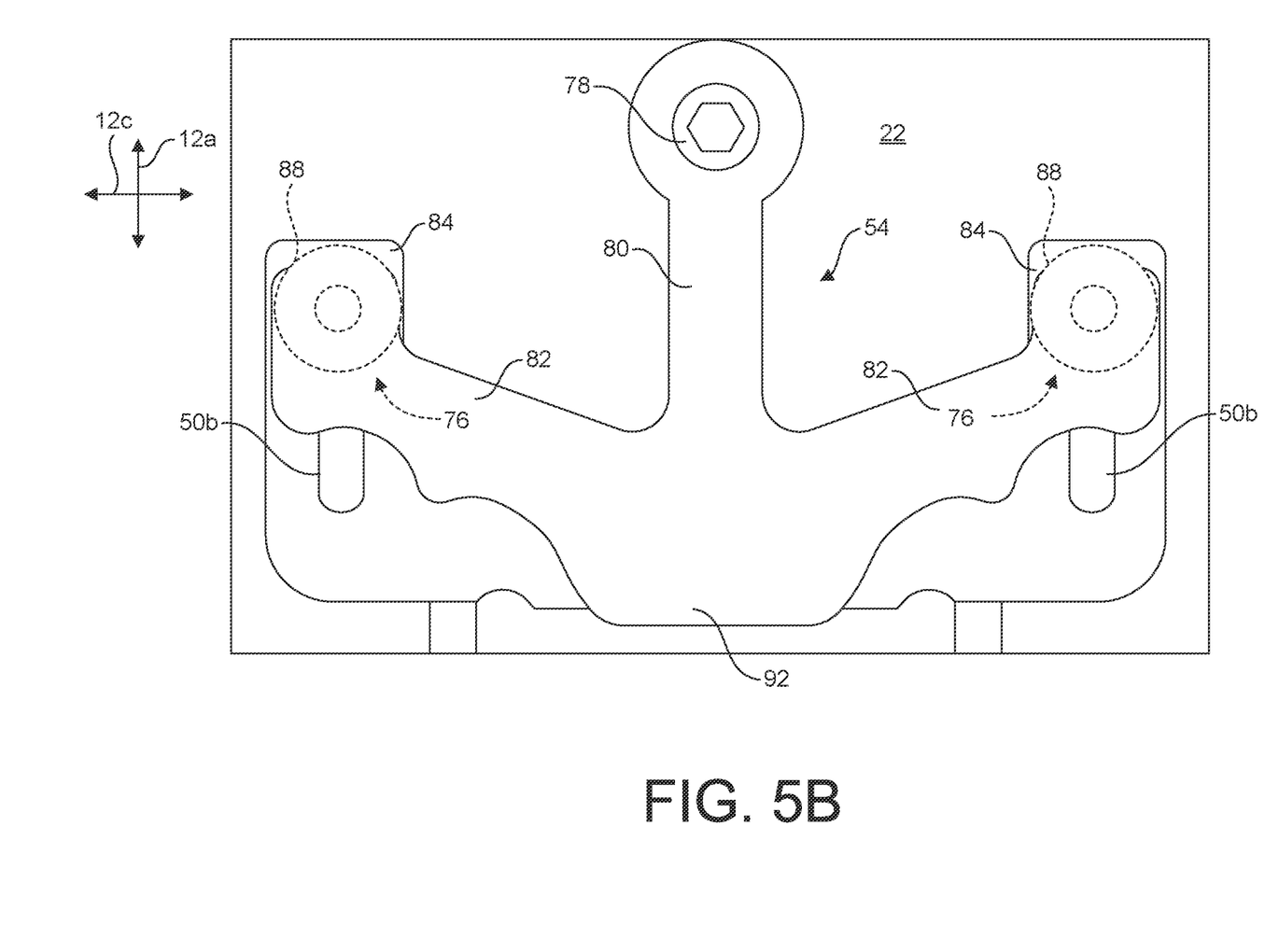
Figure 6A:
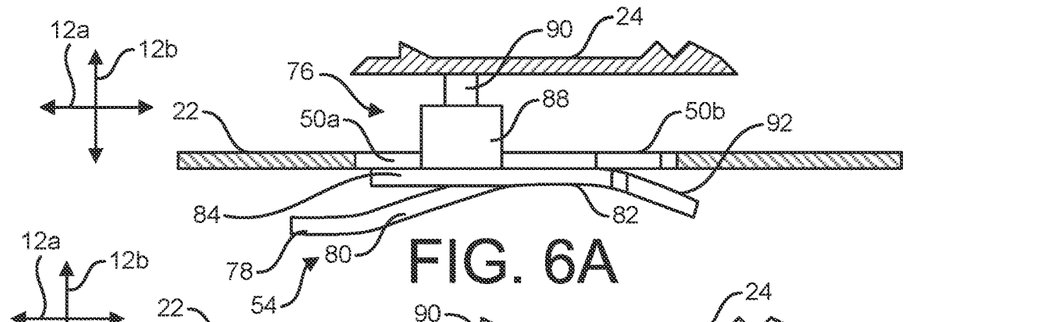
FIGS. 6A through 6E are side views of the latch spring illustrating engagement of the helmet mount in accordance with an embodiment of the present invention.
Figure 6B:
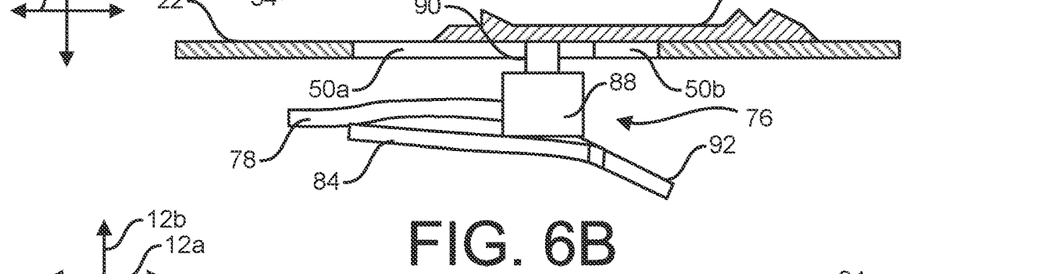
Figure 6C:
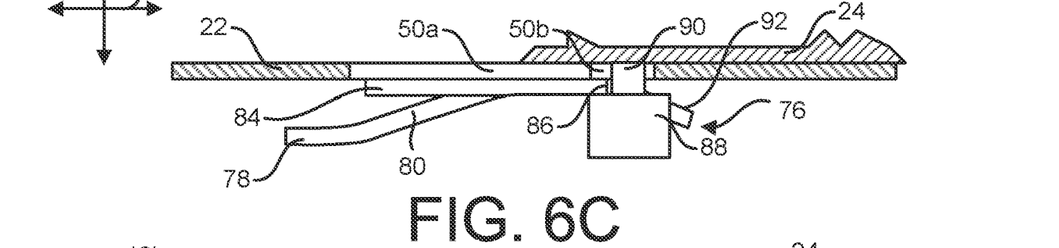

Referring to FIGS. 5B and 6A, when attaching the accessory mount 24 the rearward pins 76 may be placed over the widened portions 50b of the rearward openings 50 such that the head 88 of each pin 76 is pressing against one of the distal plates 84. The wearer may press down against the distal plates 84, causing deformation of the latching spring 54, such as shown in FIG. 6B. The accessory mount 24 may then be slid rearwardly, driving a narrow portion 90 of each pin 76 into the narrow portion 50b of the rearward openings 50 as shown in FIG. 6C. The forward pins 74 may likewise include a head 88 and narrow portion 90 such that at the same time the narrow portions 90 of the pins 74 are driven into the forward notches 52.

Figure 5C:
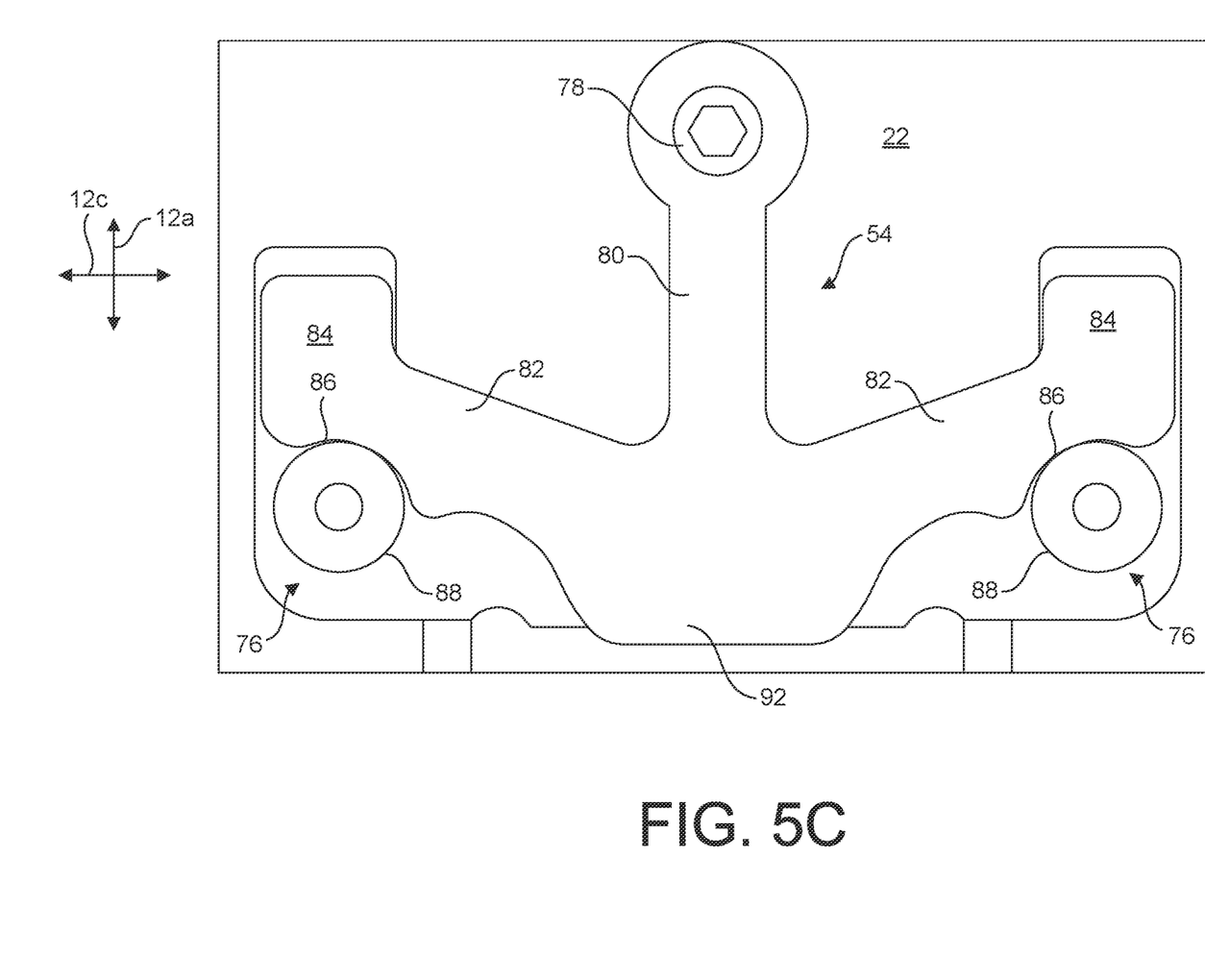
Figure 6D:
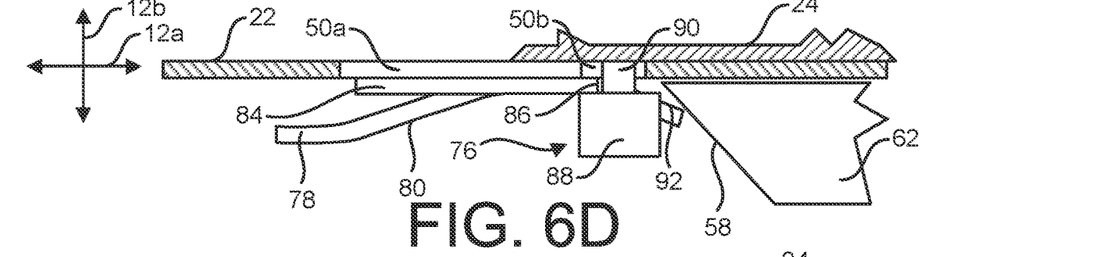

Once the heads 88 of the pins 76 have moved rearward of the latching surfaces 86 of the distal plates 84, the latching spring 54 may urge the distal plates 84 back toward the latching plate 22 as shown in FIGS. 5C and 6D. The latching surfaces 86 thereafter hinders movement of the heads 88 forwardly. The heads 88 are wider than the narrow portion 50b, which prevents vertical removal of the pins 76.

Figure 6E:
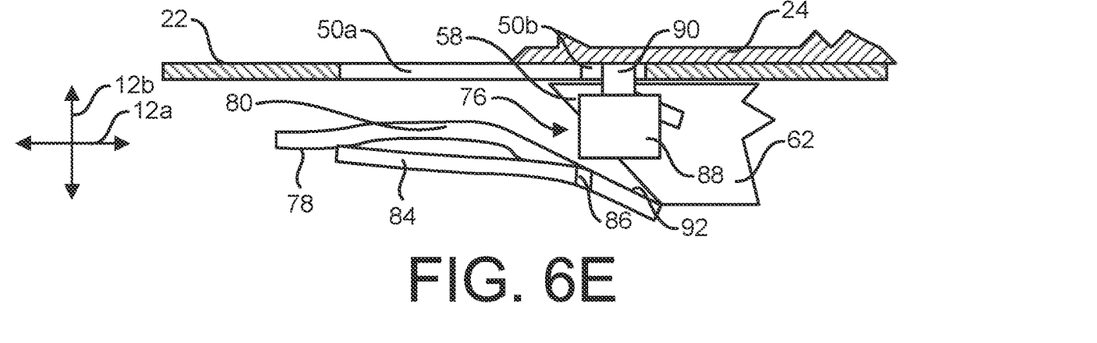

The operation of the detachment wedge 58 may be understood with respect to FIGS. 6D and 6E. The latching spring 54 may include sloped or rounded end portion 92 facing the detachment wedge. For example, the sloped end portion 92 may slope away from a lower surface of the latching plate 22 with movement in the rearward direction. The wearer may press on the gripping portion 64 and urge the plug 62 and detachment wedge 58 forwardly, thereby driving the latching spring 54 downwardly along the vertical direction 12b. This likewise causes the distal plates 84 to move downwardly past the heads 88 of the rearward pins 76. The accessory mount 24 is now free to move forwardly such that the pins 74 and 76 are moved out of the forward notches 52 and narrow portions 50b, respectively, and the pins 76 may be withdrawn from the widened portion 50a, thereby detaching the accessory mount 24 from the latching plate 22.

Various alternatives to the illustrated embodiments may be used. For example, the distal plates 84 may be mounted on separate springs rather than a common latching spring 54 and may be made of a different material than that forming the spring or springs. Likewise, in some applications a single notch 52 and single latching opening 50 may be used with a single pin 74 and a single pin 76. Alternatively, there may be three or more instances of each of the notch 52, latching opening 50, pins 74 and 76, and distal pads 84 where greater latching strength is required. In addition, the detachment wedge 58 and plug may move along the vertical direction 12b or transverse direction 12c to apply force a downward force to the latching spring 74.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A helmet mount comprising:
    a latching plate configured to secure to a helmet and defining first latching structures;
    one or more first electrical contacts coupled to the latching plate;
    an accessory mount configured to secure to an accessory for use by a wearer of the helmet, the accessory mount including second latching structures configured to removably engage the first latching structures; and
    one or more second electrical contacts mounted to the accessory mount and positioned to be in electrical contact with the one or more first electrical contacts when the first latching structures are engaged with the one or more second electrical contacts;
    wherein:
        the latching plate defines a longitudinal direction, a vertical direction perpendicular to the longitudinal direction, and a transverse direction perpendicular to the longitudinal direction and the vertical direction;
        the first latching structures include the latching plate defining a latching opening extending along the longitudinal direction between a first end of the latching opening and a second end of the latching opening opposite the first end, the latching opening including a wide portion extending from the first end along the longitudinal direction and a narrow portion extending from the wide portion to the second end along the longitudinal direction, the narrow portion being narrower than the wide portion in the transverse direction;
        the second latching structures include a first pin having a first shaft and a first widened head portion at a distal end of the first shaft that is wider than the first shaft, the first widened head portion being sized to be insertable through the wide portion but not the narrow portion and the first shaft being sized to be slidable within the narrow portion;
        a latching spring is mounted below the latching plate and defines a spring portion biased against the latching plate and overlapping the latching opening, the spring portion including a latching edge that is offset from the second end of the latching opening such that the first shaft is positionable in the narrow portion of the latching opening with the latching edge engaging the first widened head portion; and
        the latching spring further comprises a sloped surface, the helmet mount further comprising:
            a wedge slidably coupled to the latching plate and slidable along the longitudinal direction into engagement with the sloped surface in order to urge the latching spring away from the latching plate; and
            a biasing member engaging the wedge and urging the wedge away from the sloped surface.

2. The helmet mount of claim 1, further comprising night-vision goggles coupled to the accessory mount, the night-vision goggles being electrically coupled to the one or more second electrical contacts.

3. The helmet mount of claim 2, further comprising a power source electrically coupled to the one or more first electrical contacts.

4. The helmet mount of claim 1, wherein the latching plate includes a planar portion configured to face a front of the helmet when secured thereto and wherein no portion of the helmet mount extends above the planar portion.

5. The helmet mount of claim 1, wherein:
the latching plate defines a longitudinal direction, a vertical direction perpendicular to the longitudinal direction, and a transverse direction perpendicular to the longitudinal direction and the vertical direction;
the first latching structures include the latching plate defining a latching opening extending along the longitudinal direction between a first end of the latching opening and a second end of the latching opening opposite the first end, the latching opening including a wide portion extending from the first end along the longitudinal direction and a narrow portion extending from the wide portion to the second end along the longitudinal direction, the narrow portion being narrower than the wide portion in the transverse direction;
the second latching structures include a first pin having a first shaft and a first widened head portion at a distal end of the first shaft that is wider than the first shaft, the first widened head portion being sized to be insertable through the wide portion but not the narrow portion and the first shaft being sized to be slidable within the narrow portion; and
a latching spring is mounted below the latching plate and defines a spring portion biased against the latching plate and overlapping the latching opening, the spring portion including a latching edge that is offset from the second end of the latching opening such that the first shaft is positionable in the narrow portion of the latching opening with the latching edge engaging the first widened head portion.

6. A helmet mount comprising:
a latching plate configured to secure to a helmet and defining first latching structures;
one or more first electrical contacts coupled to the latching plate;
an accessory mount configured to secure to an accessory for use by a wearer of the helmet, the accessory mount including second latching structures configured to removably engage the first latching structures; and
one or more second electrical contacts mounted to the accessory mount and positioned to be in electrical contact with the one or more first electrical contacts when the first latching structures are engaged with the one or more second electrical contacts;
wherein:
the latching plate defines a longitudinal direction, a vertical direction perpendicular to the longitudinal direction, and a transverse direction perpendicular to the longitudinal direction and the vertical direction, the latching plate having an upper surface and a lower surface opposite the upper surface along the vertical direction;
the first latching structures include the latching plate defining a latching opening extending along the longitudinal direction between a first end of the latching opening and a second end of the latching opening opposite the first end, the latching opening including a wide portion extending from the first end along the longitudinal direction and a narrow portion extending from the wide portion to the second end along the longitudinal direction, the narrow portion being narrower than the wide portion in the transverse direction;
the second latching structures include a first pin having a first shaft and a first widened head portion at a distal end of the first shaft that is wider than the first shaft, the first widened head portion being sized to be insertable through the wide portion but not the narrow portion and the first shaft being sized to be slidable within the narrow portion;
a latching spring is mounted below the lower surface of the latching plate and defines a spring portion biased against the latching plate and overlapping the latching opening, the spring portion including a latching edge that is offset from the second end of the latching opening such that the first shaft is positionable in the narrow portion of the latching opening with the latching edge engaging the first widened head portion;
the accessory mount further includes a second pin including a second shaft and a second widened head portion at a distal end of the second shaft that is wider than the second shaft;
the latching plate further comprises a notch extending inwardly from an edge of the latching plate such that the first end of the latching opening is positioned between the notch and the second end of the latching opening, the notch being positioned such that the second shaft is positionable in the notch with the second widened head portion preventing the second pin from being pulled out of the notch perpendicular to the upper surface when the first shaft is positioned within the narrow portion; and
the narrow portion and the notch both include straight portions parallel to the longitudinal direction.

7. The helmet mount of claim 5, further comprising a base plate having a curved lower surface shaped to conform to a helmet, the latching plate being mounted to an upper surface of the base plate.

8. The helmet mount of claim 7, wherein the base plate defines an opening, the latching spring being positioned within the opening.

9. The helmet mount of claim 5, wherein the spring portion is a planar portion at a distal end of the latching spring.

10. A helmet mount comprising:
a latching plate configured to secure to a helmet and defining first latching structures, the latching plate including a front edge configure to face a front of the helmet when secured thereto; and
an accessory mount configured to secure to an accessory for use by a wearer of the helmet, the accessory mount including second latching structures configured to removably engage the first latching structures in response to sliding of the accessory mount rearwardly over the front edge onto the latching plate;
wherein the latching plate includes a planar portion defining the front edge, the first latching structures being positioned completely below an upper surface of the planar portion and completely rearward of the front edge;
wherein the helmet mount further comprises:
a base plate having a lower surface that is contoured to conform to an outer surface of a helmet, the latching plate being secured to an upper surface of the base plate;
wherein the latching plate defines:
a longitudinal direction, a vertical direction perpendicular to the longitudinal direction, and a transverse direction perpendicular to the longitudinal direction and the vertical direction;

two latching openings offset from one another along the transverse direction, each latching opening having a first end and a second end offset from the first end along the longitudinal direction and having a wide portion extending from the first end along the longitudinal direction and a narrow portion extending from the wide portion to the second end along the longitudinal direction, the narrow portion being narrower than the wide portion in the transverse direction; and two notches extending inwardly from an edge of the latching plate such that the first ends of the two latching openings are positioned between the two notches and the second ends of the two latching openings;

wherein the accessory mount includes two first pins and two second pins, each pin of the two first pins and two second pins having a shaft and a widened head portion at a distal end of the shaft that is wider than the shaft, the two first pins being positionable with shafts of the two first pins inserted in the narrow portions of the two latching openings when the shafts of the two second pins are inserted within the two notches; and wherein one or more latching springs are mounted below the latching plate and configured to urge two latching portions against an underside of the latching plate overlapping at least part of the wide portions of the two latching openings, the two latching portions defining latching surfaces configured to engage the widened head portions of the two first pins when the shafts of the two first pins are inserted within the narrow portions of the two latching openings.

11. The helmet mount of claim 10, wherein the one or more latching springs comprise a single latching spring, the single latching spring comprising:

an attachment point secured to the base plate;
a web extending from the attachment point;
two wings extending from opposite sides of the web; and
two plates each secured to a distal end of one of the two wings, the two plates being positioned under the wide portions of the two latching openings and defining the latching surfaces.

12. The helmet mount of claim 11, wherein the attachment point secures to the base plate below the upper surface of the base plate and wherein the web slopes upwardly from the attachment point toward the latching plate.

13. The helmet mount of claim 12, further comprising a sloped portion secured to the web and sloping downwardly from the web, the helmet mount further comprising:

a plug slidably mounted within the base plate and slidable along the longitudinal direction;
a wedge mounted to the plug and positioned to engage the sloped portion and urge the sloped portion away from the latching plate when the plug is urged toward the sloped portion; and
one or more biasing members engaging the plug and the base plate and configured to urge the plug away from the sloped portion.

14. The helmet mount of claim 10, wherein the base plate is made of plastic and the latching plate is made of metal.

15. The helmet mount of claim 10, further comprising one or more first electrical contacts mounted to the base plate, the accessory mount further including one or more second electrical contacts that are in electrical contact with the one or more first electrical contacts when the shafts of the two first pins are positioned in the narrow portions of the two latching openings and the shafts of the two second pins are positioned in the two notches.

16. The helmet mount of claim 15, further comprising night-vision goggles mounted to the accessory mount.

17. The helmet mount of claim 16, further comprising a power source electrically coupled to the one or more first electrical contacts.

* * * * *